US006994525B2

(12) United States Patent
Weisse et al.

(10) Patent No.: US 6,994,525 B2
(45) Date of Patent: Feb. 7, 2006

(54) HOLLOW FAN BLADE FOR GAS TURBINE ENGINE

(75) Inventors: Michael A. Weisse, Tolland, CT (US);
William D. Owen, Windsor, CT (US);
Christopher Mark Palazzini, Windsor, CT (US); Daniel J. Whitesell, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 74 days.

(21) Appl. No.: 10/765,592

(22) Filed: Jan. 26, 2004

(65) Prior Publication Data

US 2005/0163619 A1    Jul. 28, 2005

(51) Int. Cl.
*F01D 5/18* (2006.01)
(52) U.S. Cl. .................................. 416/233; 29/889.72
(58) Field of Classification Search ............ 416/236 R, 416/223 R, 233; 29/889.72
See application file for complete search history.

(56) References Cited

U.S. PATENT DOCUMENTS

| | | | |
|---|---|---|---|
| 4,501,053 A * | 2/1985 | Craig et al. ............ | 29/889.721 |
| 5,536,143 A * | 7/1996 | Jacala et al. .............. | 416/96 R |
| 5,957,658 A | 9/1999 | Kasprow et al. | |
| 6,146,099 A | 11/2000 | Zipps et al. | |
| 6,607,355 B2 | 8/2003 | Cunha et al. | |
| 6,637,186 B1 | 10/2003 | Van Duyn | |

FOREIGN PATENT DOCUMENTS

JP         58148201 A   *  9/1983

OTHER PUBLICATIONS

Joe Adams, Tomorrow's Technology Today Pratt & Whitney's Vision for the Future, Nov. 6, 2001, pp. 1-21.
"Hollow Fan Blade For Gas Turbine Engine", U.S. Appl. No. 10/765,347; filed Jan. 26, 2004.
"Hollow Fan Blade For Gas Turbine Engine", U.S. Appl. No. 10/765,593; filed Jan. 26, 2004.
"Hollow Fan Blade For Gas Turbine Engine", U.S. Appl. No. 10/765,591; filed Jan. 26, 2004.
"Hollow Fan Blade For Gas Turbine Engine", U.S. Appl. No. 10/765,741; filed Jan. 26, 2004.

* cited by examiner

*Primary Examiner*—Ninh H. Nguyen
(74) *Attorney, Agent, or Firm*—Carlson, Gaskey & Olds (57) ABSTRACT

Hollow fan blades for turbo fan gas turbine engines are formed of two separate detail halves. Each detail half has a plurality of cavities and ribs machined out to reduce weight. These detail halves are subsequently bonded and given an airfoil shape in the forming operation. In one embodiment, contiguous cavities are formed around freestanding ends of the ribs to reduce the number of cavities required. The freestanding end of each rib is flared such that it has a larger width than the rest of the rib. The cavity extends continuously around the free, flared end of the rib.

25 Claims, 9 Drawing Sheets

HOLLOW FAN BLADE FOR GAS TURBINE ENGINE

BACKGROUND OF THE INVENTION

The present invention relates generally to gas turbine engines and more particularly to an improved hollow fan blade for a gas turbine engine.

A gas turbine engine, such as a turbo fan engine for an aircraft, includes a fan section, a compression section, a combustion section and a turbine section. An axis of the engine is centrally disposed within the engine and extends longitudinally through the sections. The primary flow path for working medium gases extends axially through the sections of the engine. A secondary flow path for working medium gases extends parallel to and radially outward of the primary flow path.

The fan section includes a rotor assembly and a stator assembly. The rotor assembly of the fan includes a rotor disc and plurality of radially extending fan blades. The fan blades extend through the flow path and interact with the working medium gases and transfer energy between the fan blades and working medium gases. The stator assembly includes a fan case, which circumscribes the rotor assembly in close proximity to the tips of the fan blades.

During operation, the fan draws the working medium gases, more particularly air, into the engine. The fan raises the pressure of the air drawn along the secondary flow path, thus producing useful thrust. The air drawn along the primary flow path into the compressor section is compressed. The compressed air is channeled to the combustion section where fuel is added to the compressed air and the air/fuel mixture is burned. The products of combustion are discharged to the turbine section. The turbine section extracts work from these products to power the fan and compressed air. Any energy from the products of combustion not needed to drive the fan and compressor contributes to useful thrust.

In order to reduce weight, the fan blades in some gas turbine engines are hollow. Each fan blade is made by combining two separate detail halves. Each half includes a plurality of cavities and ribs machined out to reduce the weight while forming a structurally sound internal configuration. These halves are subsequently bonded to form the hollow fan blade. The hollow fan blade is then subjected to forming operations at extremely high temperatures at which time it is given an airfoil shape and geometry. During the forming operation, the two detail halves are twisted and cambered under high temperatures to the desired shape. Inherent to the hollow fan blade design is a set of "skins" on the convex and concave side of the airfoil. These skins undergo significant compressive loading during the bonding and forming operations. At elevated temperatures, these skins do no possess the robustness to withstand this loading, and deform by sagging or drooping inward toward the center of the blade. To prevent collapse of the cavities during the forming process, the cavities are filled with high-pressure gas to maintain their geometry during the forming operation.

To a large extent, the internal geometry of the hollow fan blades has been designed to provide bird-impact capabilities. The previous hollow fan blades had an internal geometry comprising numerous machined internal cavities and associated ribs primarily running radially with secondary ribs running chord-wise.

There are several drawbacks to the known hollow fan blades. First, using the high-pressure gas required during forming operation increases time and cost of the operation. Additionally, the intersecting ribs in the hollow fan blades require numerous different diameter cutters and numerous cutting operations to achieve the small fillets that the objectives dictate. This also increases the time and cost of manufacturing the hollow fan blades.

SUMMARY OF THE INVENTION

The present invention provides a hollow fan blade with internal cavity and rib geometry with improved durability while minimizing weight and cost. In the present invention, the hollow fan blade has an internal geometry design that minimizes the number of internal cavities (or at least cutter plunge cuts), maximizes cutter size, and minimizes the time required to machine them. The improved internal cavity and rib pattern of the hollow fan blade improve structural, produceability and economic considerations.

In one embodiment, a contiguous cavity is formed around a freestanding end of each rib. As a result fewer cavities are required, thereby reducing time and cost. The freestanding end is flared such that it has a larger width than the rest of the rib. The cavity extends continuously around the free, flared end of the rib. The flared end increases the strength of the bond joint in that location. It also increases the footprint at the base of the fillet, which improves the stiffness in the vicinity of the flared end, which reduces the load on the bond joint

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
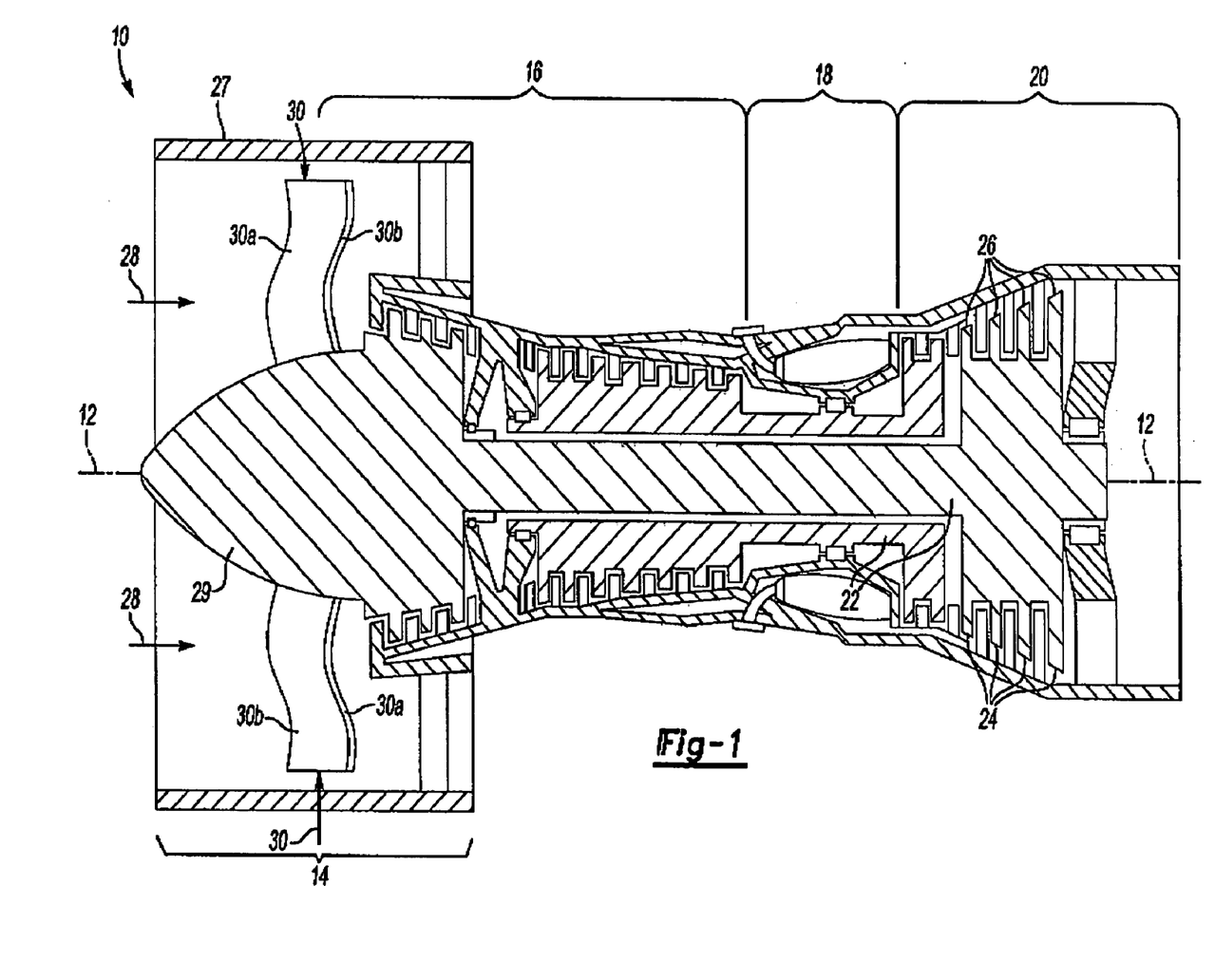
FIG. 1 is a sectional view of an axial flow, turbo fan gas turbine engine with the hollow fan blades of the present invention.

A gas turbine engine 10, such as a turbofan gas turbine engine, circumferentially disposed about an engine centerline, or axial centerline axis 12 is shown. The engine 10 includes a fan 14, a compressor 16, a combustion section 18 and a turbine 20. As is well known in the art, air compressed in the compressor 16 is mixed with fuel which is burned in the combustion section 18 and expanded in turbine 20. The air compressed in the compressor and the fuel mixture expanded in the turbine 20 can both be referred to as a hot gas stream flow 28. The turbine 20 includes rotors 22 which rotate in response to the expansion, driving the compressor 16 and fan 14. The turbine 20 comprises alternating rows of rotary airfoils or blades 24 and static airfoils or vanes 26.

The fan 14 is surrounded by a fan case 27 and includes a rotor assembly. The rotor assembly includes a rotor disk 29 and a plurality of fan blades 30. Each fan blade 30 extends radially outwardly from the rotor disk 29 across the working medium flow paths into proximity with the fan case 27. The fan blades 30 are hollow fan blades and include a first hollow fan blade detail half 30a and a second hollow fan blade detail half 30b.

Figure 2:
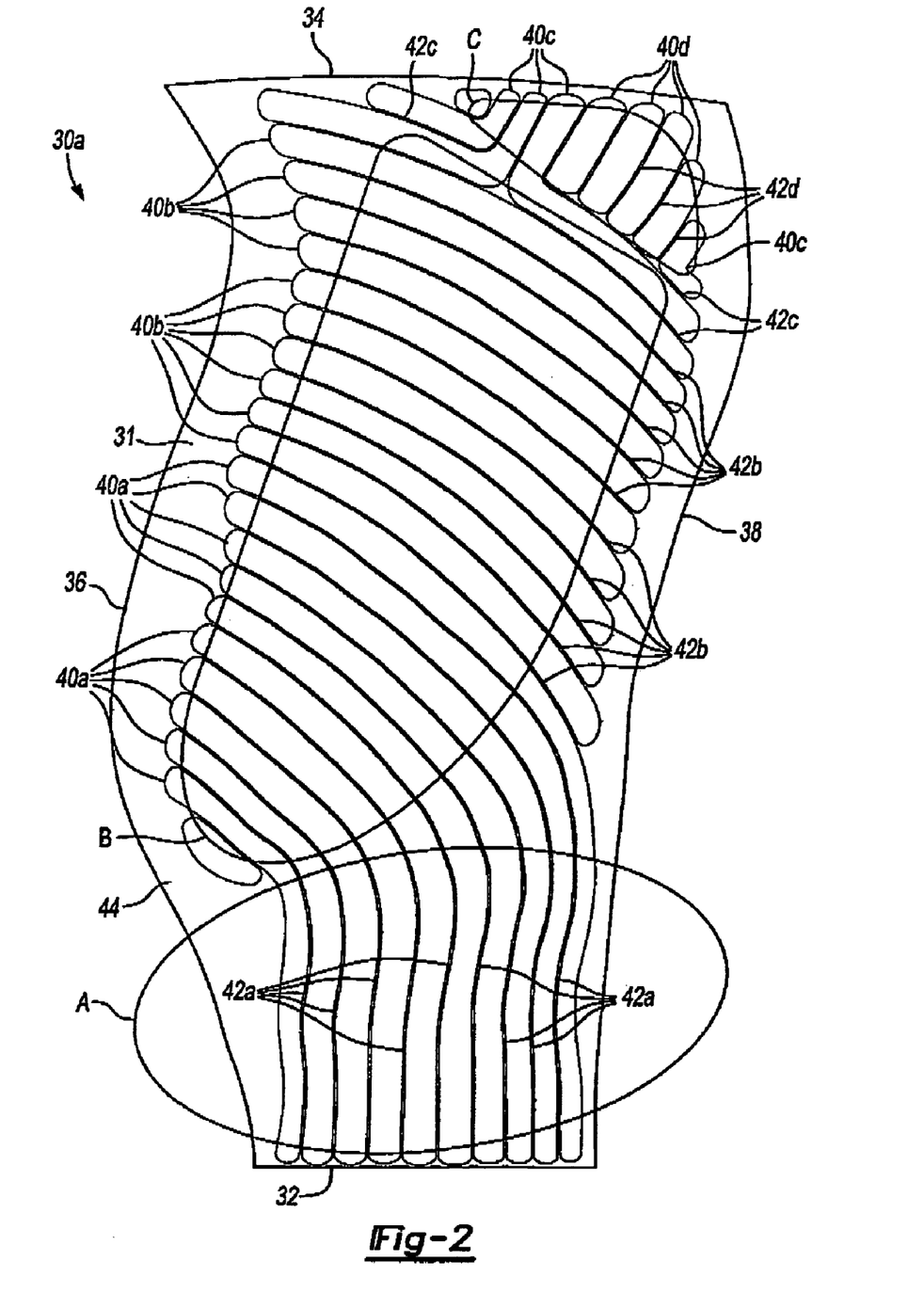
FIG. 2 is a plan view of one detailed half of one of the hollow fan blades of FIG. 1.

A first embodiment of one fan blade detail half 30a is shown in FIG. 2. The other fan blade detail half 30b would be complementary. The fan blade detail half 30a comprises a substrate 31, preferably Titanium, having a root edge 32 opposite a tip 34 and a leading edge 36 opposite a trailing edge 38. The fan blade detail half 30a includes Region A, which is approximately the radially inner-most third adjacent the root edge 32. Region B extends from Region A toward the tip 34, excluding a corner area adjacent the tip 34 and trailing edge 38, which is Region C.

In order to reduce weight while still maintaining the necessary stiffness and strength, a plurality of elongated continuous cavities 40a–d are machined into the interior surface of the substrate 31. The cavities 40a–d are spaced from one another to form a plurality of continuous, non-intersecting ribs 42a–d. Alternatively (or additionally), the ribs 42a–d are superplastically formed. Throughout this description, the reference numeral 40 may be used to refer to the cavities 40 generically, while for specific subsets of cavities 40, the reference numeral 40 will be appended with one or more of the letters a–d. Similarly, the reference numeral 42 may be used generically for the ribs 42a–d.

The ribs 42 are oriented and biased in order to provide stiffness where needed, both during forming and during use in the turbine engine 10 of FIG. 1. Further, the ribs 42 curve and change direction to eliminate any long, straight cavities 40, which would have low inertia. Preferably, the cavities 40 do not continue in any direction for lengths greater than half the blade chord.

A first subset of cavities 40a and ribs 42a extend continuously from the root edge 32 toward the leading edge 36. The cavities 40a and ribs 42a extend from the root edge 32 initially radially outward (i.e. toward the tip 34) in Region A and then curve slightly away from and then toward the leading edge 36 at substantially a 45 degree angle but in a curved path in Region B. Region A is an area of significant blade pull (i.e. P/A). The portions of the ribs 42a in Region A help carry the load on the blade half 30a. The radially-extending portions of ribs 42a also minimize any stress concentration from the fillets. The slight curves in Region A prevent cavity 40a collapse during the forming process, when the fan blade detail half 30a is formed to its desired shape.

In Region B, a second subset of cavities 40b and ribs 42b extend continuously from the leading edge 36 toward the trailing edge 38 and curve downwardly slightly toward the root edge 32 at approximately a 45 degree angle, but in a curved path. These portions of the ribs 42a and ribs 42b in Region B extend substantially chordwise (at approximately a 45 degree angle) at the leading edge to provide bird strike stiffness.

A third subset of cavities 40c and ribs 42c extend continuously along a curve approximately 45 degree chordwise path and then sharply curve perpendicularly to extend substantially radially toward the tip 34 and trailing edge 38 at approximately a 60 degree angle. A fourth subset of cavities 40d and ribs 42d extend continuously along a curved path substantially radially and toward the tip 34 and the trailing edge 38 at an approximately 60 degree angle. In Region C, these ribs 42c and 42d are oriented transversely to the tip 34 to provide strength in the event of a tip 34 rub on the inner surface of the fan housing. Rib orientation in Region C is close to perpendicular to rib orientation of Region B where they meet in order to minimize mass of the fillets, which are a result of the cutter radius.

Generally, near the tip 34, stiffness is needed in the radial direction for tip rub events. Diagonal stiffness is needed in the corners adjacent the tip 34 and leading edge 36 and adjacent the tip 34 and trailing edge 38.

The cavities 40 are all formed in the substrate 31 between the root edge 32 and the tip 34, and between the leading edge 36 and trailing edge 38. Along each edge 32, 34, 36, 38 is a frame 44 that is substantially equal to the thickness of the ribs 42. Each of the ribs 42 is contiguous with the frame 44 at both ends. Each of the cavities 40 begins and terminates adjacent the frame 44. The termination points occur in regions where the airfoil thickness is relatively low, which reduces the depth the cutters have to plunge into the part to start machining.

Figure 3:
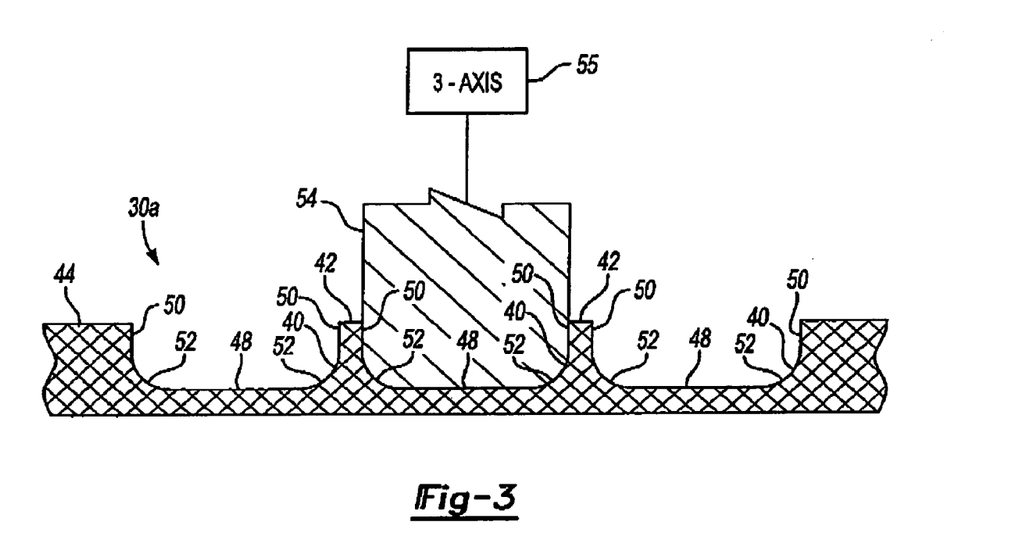
FIG. 3 is a sectional view through three of the cavities of the detail half of FIG. 2 and through a cutter for forming the cavities.

FIG. 3 is a sectional view of the detail half 30a being machined by a cutter 54. Each cavity 40 has a floor 48 between opposite wall interior surfaces 50, some of which define the ribs 42. Each cavity 40 further includes a radius 42 transition between the wall interior surface 50 and the floor 48. As shown, the floor 48 and both wall interior surfaces 50 are preferably cut simultaneously in a single pass by the cutter 54. Because the cavities 40 are continuous and the ribs 42 do not intersect, each cavity 40 is formed in a single pass with a single cutter. Alternatively, the cavities 40 may each be formed in a single rough cut and a second, finish cut, but this is still a significant reduction in the number of cuts and cutters required. Additionally, because floor radius is relatively large and approximately follows the curvature of the external surface of the cutter 54 can be operated by a 3-axis machine 55 (shown schematically), instead of the previously-required 5-axis machine. In addition, because there are no transversely-extending ribs intersecting the ribs 42 the number of cutters of different diameters required is greatly reduced. A detail half could conceivably be done with a single form cutter, including both rough and finish passes. The other fan blade detail half 30b would be made in a similar manner.

Figure 4:
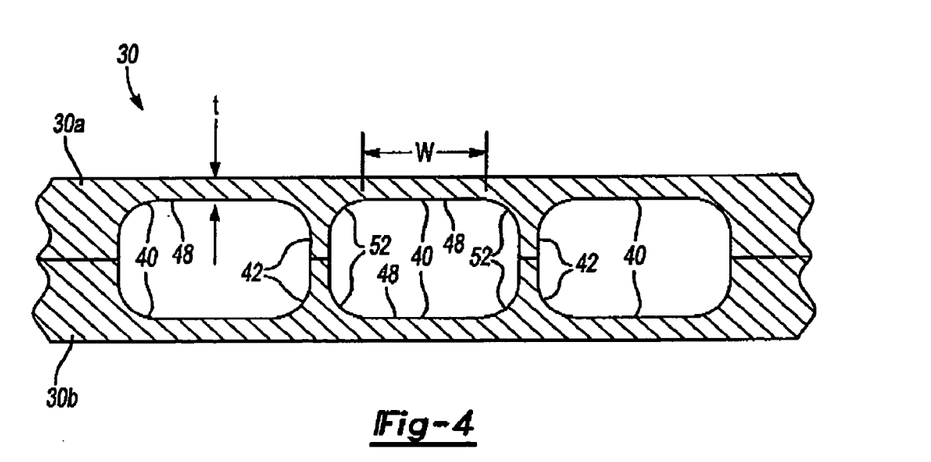
FIG. 4 is a sectional view through an assembled fan blade corresponding to the fan blade detail half of FIG. 3.

FIG. 4 is a sectional view of a portion of the fan blade 30. The ribs 42 of fan blade detail half 30a are aligned and joined with the ribs 42 of the fan blade detail half 30b. To provide increased strength during forming and during use, the ribs 42 are tapered and transition into a compound radius (including radius 52 and the floor 48) that simulates the classical arch design element. The two radii (of the radius 52 and floor 48) should be selected such that the transition between each other and the tapered wall geometry are smooth and gradual. The sizing will depend upon the required load transitioning and carrying capabilities. Preferably, the ratio of the width w of the cavity at the rib wall fillet run out to the thickness t of the floor 48 should be less than ten, but can be larger if the rib can be aligned more parallel to the load.

After the halves 30a, b are bonded, the fan blade 30 is given an airfoil shape in a forming operation, which is illustrated in FIGS. 5–9. During the forming operation, the two detail halves are twisted and cambered to the desired shape under high heat. Because of the orientation and shape, as well as the spacing, of the ribs 42 as described and shown, the cavities 40 do not require a high pressure gas to increase their strength and prevent cavity collapse during the forming operation. This reduces the time and expense of the forming operation.

Figure 5:
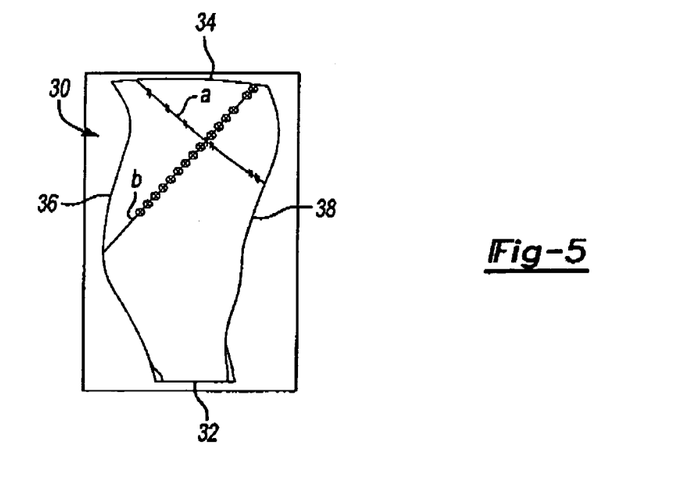
FIG. 5 is a rear view of the assembled fan blade of FIG. 4, illustrating two section lines.
Figure 6:
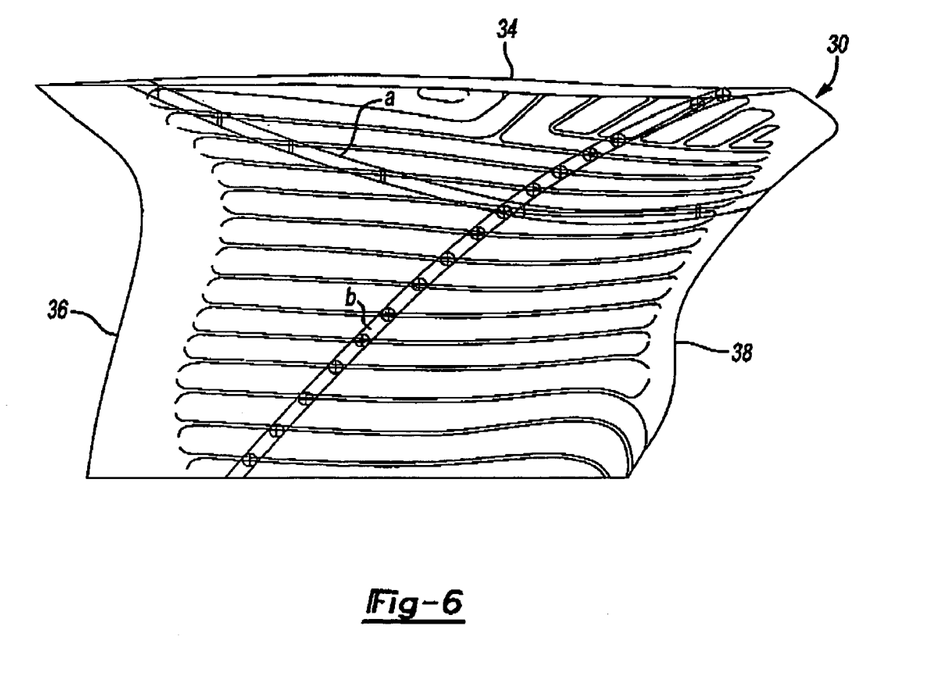
FIG. 6 is an enlarged, top perspective view of the fan blade of FIG. 5.

FIG. 5 is a rear view of the assembled fan blade 30 of FIG. 4, illustrating two section lines, a and b, through the fan blade 30. FIG. 6 is an enlarged, top perspective view of the fan blade of FIG. 5. As can be seen in FIG. 6, the section line a extends from a position generally near the corner of the tip 34 and leading edge 36 rearwardly to the trailing edge 38 and downwardly toward the root edge 32 (FIG. 5). The section lines a, b assist in visualizing the twisting and cambering of the fan blade 30 relative to the ribs 42 and cavities 40.

Figure 7:
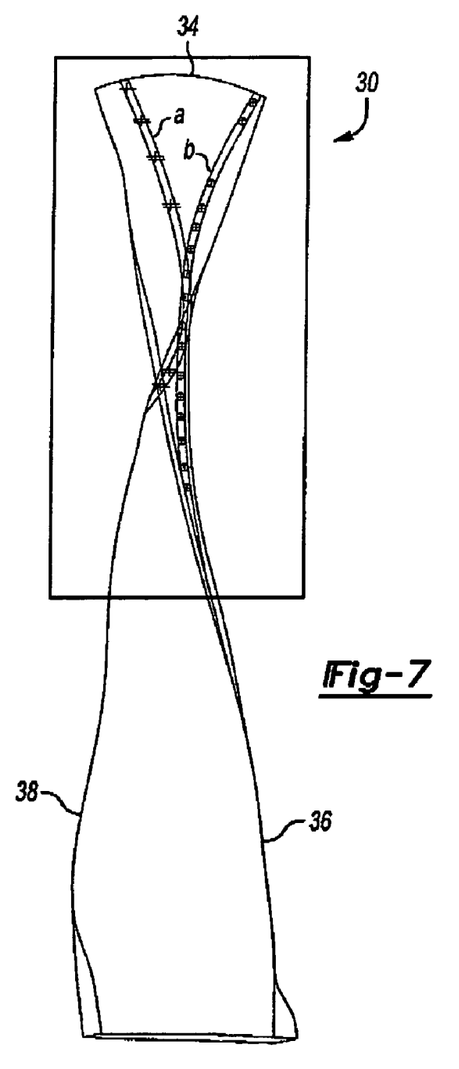
FIG. 7 is a front view of the fan blade of FIG. 4, after the twisting and cambering operation.
Figure 8:
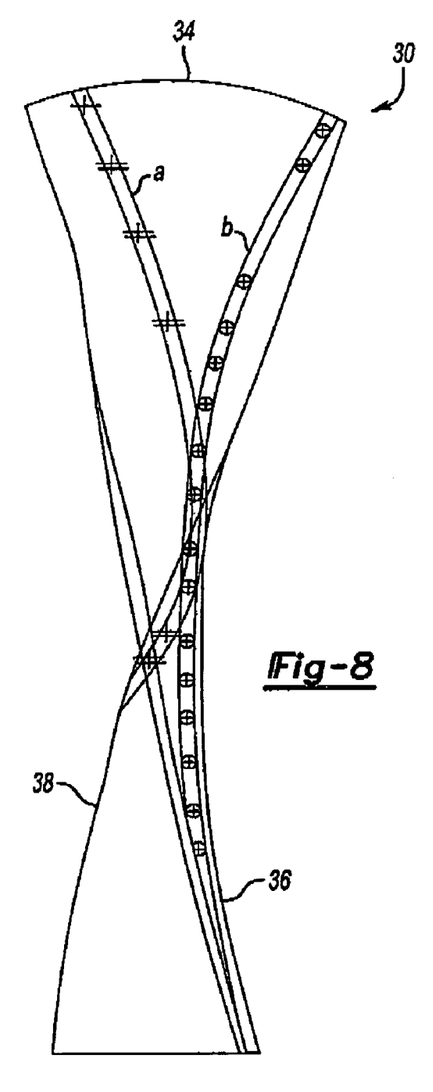
FIG. 8 is an enlarged view of the upper portion of the fan blade of FIG. 7.
Figure 9:
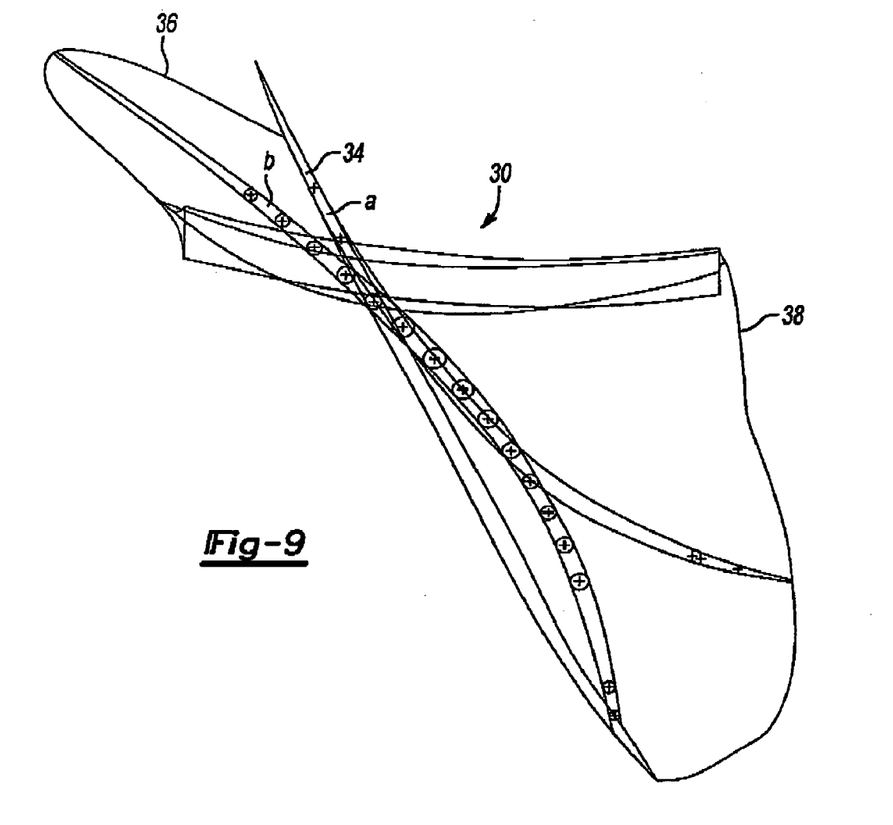
FIG. 9 is top view of the fan blade of FIG. 7.

FIG. 7 is a front view of the fan blade of FIG. 4 after the forming operation, showing the resulting locations of sections a and b. FIG. 8 is an enlarged view of the upper portion of the fan blade of FIG. 7. FIG. 9 is top view of the fan blade of FIG. 7. As can be seen by referencing FIG. 5 with respect to FIGS. 7–9, the orientation of the ribs 42 should be in a parallel plane with the load vector that results from forming loads during the pre-form and final form operations. This orientation presents the optimum configuration for load carrying capability and compressive stress transfer into the ribs 42 and away from the concave and convex skins. The specific orientation of the ribs 42 is therefore dependent upon the final shape of the fan blade 30, which will vary from one engine to another. Obviously, there are trade-offs and balancing among the various requirements as described herein, such that the ribs 42 cannot always be completely in a parallel plane with the load vector. For this reason ribs totally straight are avoided.

Figure 10:
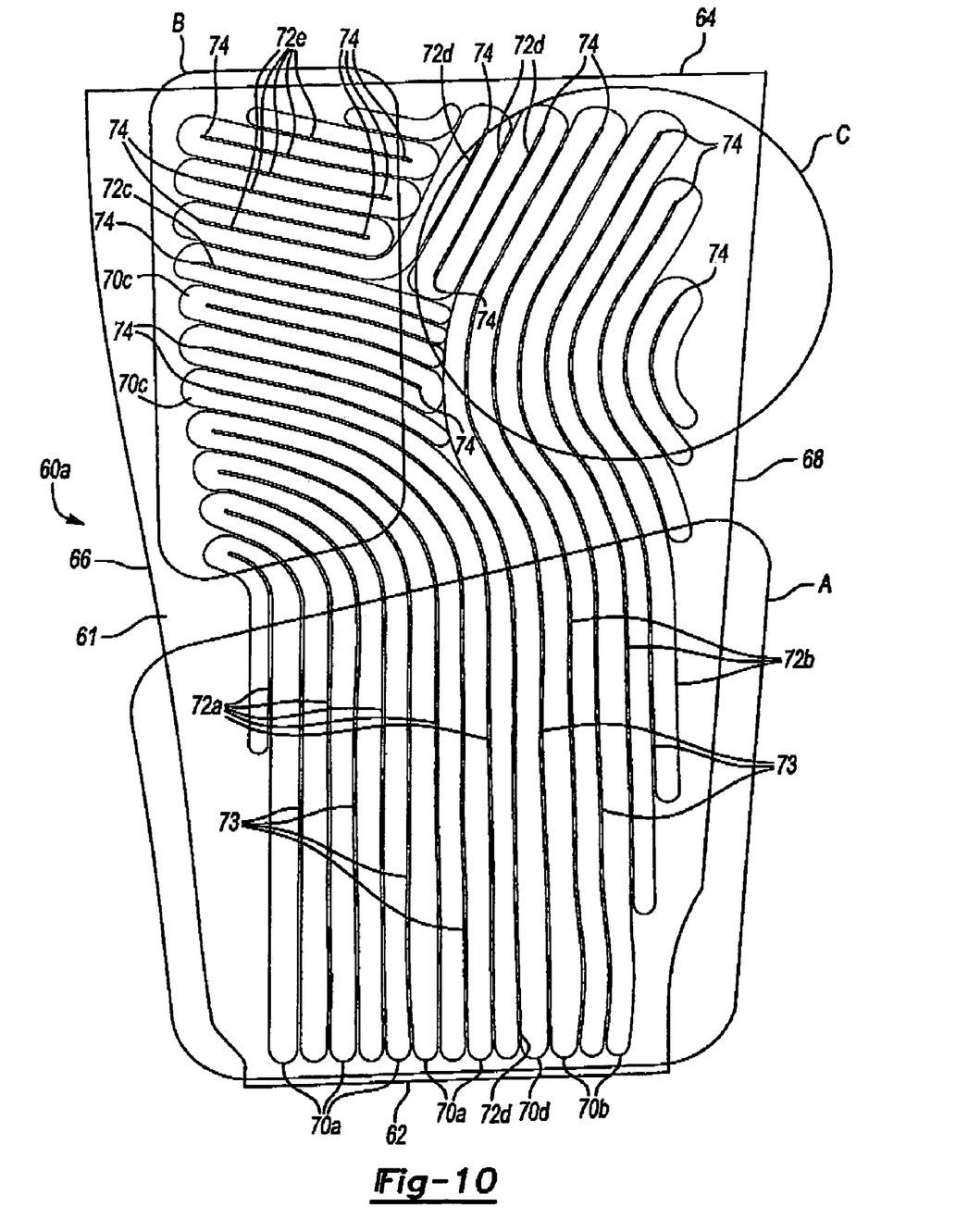
FIG. 10 is a plan view of an alternate detail half for the fan blades shown in FIG. 1.

FIG. 10 illustrates a second embodiment of a fan blade detail half 60a that could be used in the turbine engine 10 of FIG. 1. Again, the other fan blade detail half (not shown) would be complementary. The fan blade detail half 60a comprises a substrate 61, preferably Titanium, having a root edge 62 opposite a tip 64 and a leading edge 66 opposite a trailing edge 68. A plurality of elongated continuous cavities 70 are machined into or superplastically or otherwise formed on the interior surface of the substrate 61 in the manner described above with respect to FIGS. 3 and 4. The cavities 70 are spaced from one another to form a plurality of continuous non-intersecting ribs 72, 73. In this embodiment the spacing between ribs is held constant throughout.

In the second embodiment, the cavities 70a–d extend continuously alongside ribs 72a–e and ribs 73. The cavities 70a–d also extend around freestanding ends 74 of some of the ribs 72a–e, thereby reducing the number of cavities 70a–d.

The fan blade detail half 60a includes Region A, which is approximately the radially inward half. Region B comprises approximately a quarter adjacent the leading edge 66 and the tip 64. Region C comprises approximately a quarter adjacent the trailing edge 68 and the tip 64. A transition region is the central area substantially defined among the Regions A, B and C.

A first subset of cavities 70a and ribs 72a extend continuously from the root edge 62 initially radially outward in Region A, and then curving toward the leading edge 36 at substantially a 45 degree angle but in a curved path in Region B. In Region B, each cavity 70a extends continuously around a freestanding end 74 of one of the ribs 72a, thereby reducing the number of cavities 70a. Ribs 73 extend continuously parallel to the ribs 72a from the root edge 62 to the leading edge 66 between adjacent cavities 70a.

A second subset of cavities 70b and ribs 72b extend continuously from the root edge 62 initially radially outward toward the tip 64 in Region A adjacent the trailing edge 68, and curving slightly toward the leading edge 66 in the transition region and then toward the trailing edge 68 at approximately a 45 degree angle in a slightly curved path in Region C. Each cavity 70b also extends continuously around a freestanding end 74 of one of the ribs 72b, thereby reducing the number of cavities 70b. Ribs 73 are defined between adjacent cavities 70b and are parallel to the ribs 72b.

A third subset of ribs 72c extend from the leading edge 66 toward the trailing edge 68 and curve downwardly slightly toward the root edge 62 in a curved path in Region B. At least one cavity 70c extends continuously in a serpentine path around one free end 74 of one rib 72c, around the opposite free end 74 of the next rib 72c and again around the opposite free end 74 of the next rib 72c. The serpentine path further reduces the number of cavities 70 needed to define the ribs 72.

A fourth set of ribs 72d are each at least partially defined by a single cavity 70d. The cavity 70d and a rib 72d extend continuously from the root edge 62 radially outward (toward the tip 64) in Region A, then curve slightly toward the leading edge 66 in the transition region, and then slightly toward the trailing edge 68 at an approximately 60 degree angle in Region C. Near the tip 64, the cavity 70d extends continuously around the free end 74 of the rib 72d and then around alternating free ends 74 of two more ribs 72d oriented approximately 60 degrees toward the tip 64. The cavity 70d then extends continuously into Region B around alternating free ends 74 of a plurality of ribs 72e oriented substantially parallel to the ribs 72c, i.e. substantially chordwise, approximately 30 degrees and curved slightly. This long serpentine path of cavity 70d further reduces the number of cavities 70 necessary to create ribs 72.

Again, Region A is an area of significant blade pull. The portions of the ribs 72a, b, d in Region A help carry the load on the blade half 60a. The radially-extending portions of ribs 72a, b, d also minimize any stress concentration from the fillets. The substantially chordwise orientation of the portions of ribs 72a, c, d in Region B provide bird strike strength. The substantially radial orientation of the portions of the ribs 72b, d in Region C provide strength to the tip in the event of tip rub on interior of the fan housing.

Figure 11:
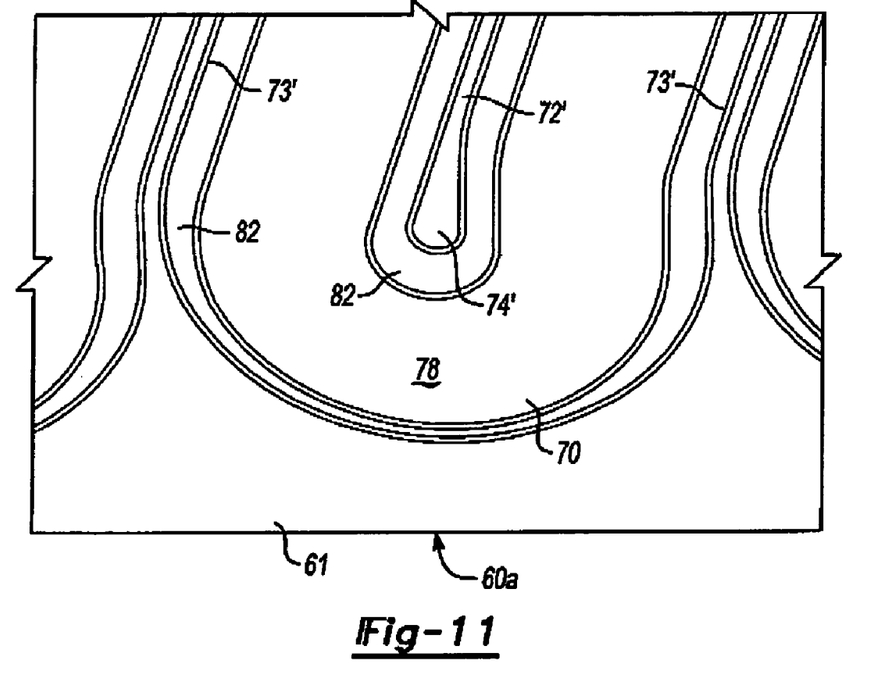
FIG. 11 is an enlarged view of an alternate rib for the detail half of FIG. 10.

By machining contiguous cavities 70 around freestanding ends 74 of the ribs 72, fewer cavities 70 are required, thereby reducing time and cost. However, the freestanding ends 74 of the ribs 72 may cause a variation in the stiffness, which can act as a stress concentration when the blade sees externally applied loads, such as from bird impact or heavy bending moments from a released neighboring blade during a blade out event. Therefore, FIG. 11 shows an enlarged view of an alternate rib 72' for the detail half 60a of FIG. 10. The alternate rib 72' would also be used in the complementary detail half (not shown). The alternate rib 72' has a freestanding end 74' that is flared such that it has a larger width than the rest of the rib 72'. The cavity 70 extends continuously around the free, flared end 74' of the rib 72'. The ribs 72' are tapered and have a radius 82 transition into the floor 78. The radius 82 extends around the flared end 74'. The ribs 73' between adjacent cavities 70 have a generally constant width. The flared end 74' increases the strength of the bond joint in that location. It also increases the footprint at the base of the fillet, which improves the stiffness in the vicinity of the flared end 74', which reduces the load on the bond joint.

Figure 12:
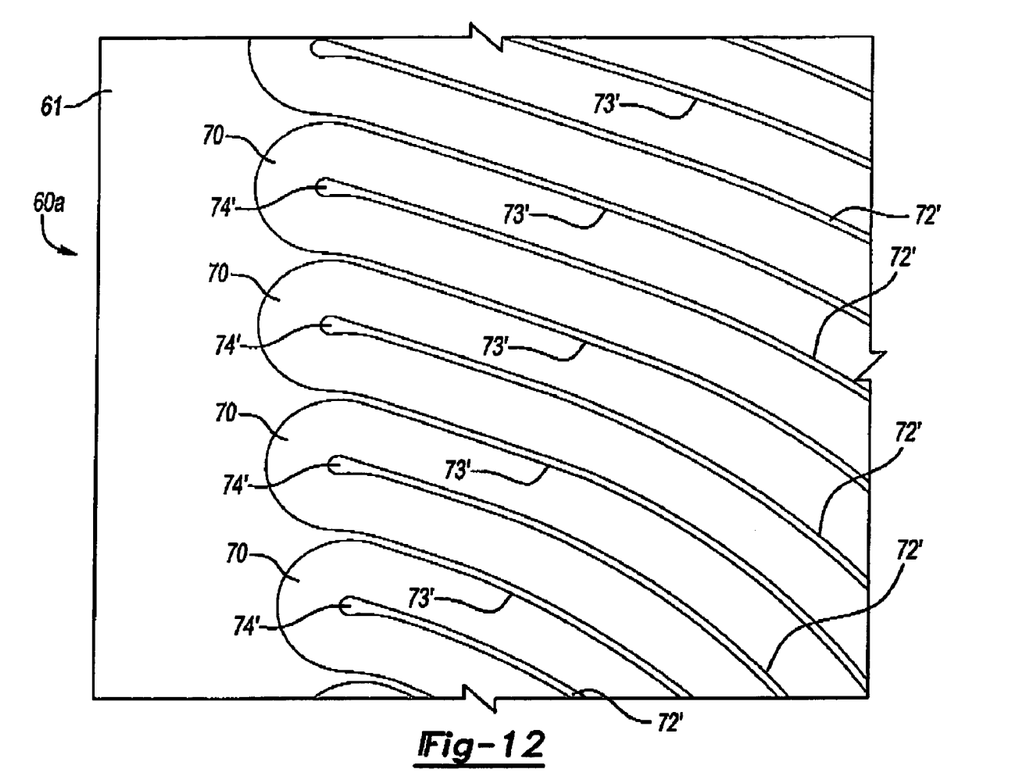
FIG. 12 shows one arrangement for a plurality of the alternate ribs of FIG. 11.
Figure 13:
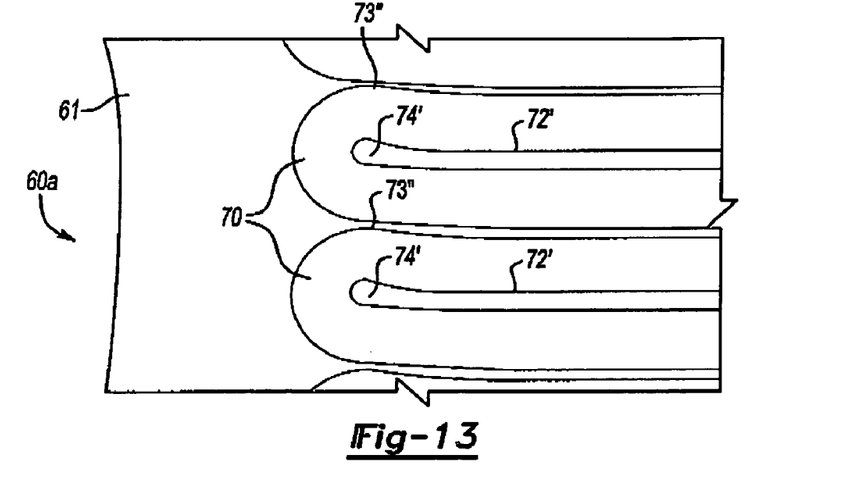
FIG. 13 shows another arrangement for a plurality of the alternate ribs of FIG. 11.

Because it would be impractical to vary the width of the cutter and the cavity 70, FIG. 12 shows one possible arrangement of a plurality of the ribs 72' with the flared ends 74'. Incorporating the flared ends 74' is achievable with minimum weight impact if the cavity 70 ends can be staggered as shown in FIG. 12. In FIG. 12, the ribs 72' and the cavities 70 that extend continuously around the flared ends 74' of the ribs 72' are staggered, such that the increased width of a flared end 74' of one rib 72' is not aligned with the flared ends 74' of the adjacent ribs 72' (referring to "alignment" in a direction perpendicular to the ribs 72'). Oblique ribs 72' are a good way to stagger the ends 74'.

Where stagger is not feasible, the thickness changes needs to be gradual or they force curvature into successive neighbors as shown in FIG. 13. In FIG. 13, the flared ends 74', ribs 72' and cavities 70 are not staggered, but are aligned. In this case, the increase in thickness at the flared ends 74' is taken from a decreased thickness in adjacent ribs 73" between adjacent cavities 70.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers for steps in the method claims are for ease of reference by dependent claims, and do not indicate a required sequence, unless otherwise indicated.

What is claimed is:

1. A hollow fan blade half comprising:
   a substrate having a root edge and an opposite tip spaced radially outward from the root, the substrate further including a leading edge opposite a trailing edge, the leading edge spaced chordwise from the trailing edge; and
   a first rib and a second rib formed on the substrate, the first rib including a flared longitudinal end.

2. The hollow fan blade half of claim 1 further including an elongated, continuous cavity between the first rib and the second rib, the first rib substantially parallel to the second rib.

3. The hollow fan blade half of claim 2 wherein the cavity extends continuously along a first path adjacent the first rib and then around the flared end.

4. The hollow fan blade half of claim 3 wherein the cavity extends continuously from the flared end along a second path between the first rib and the second rib.

5. The hollow fan blade half of claim 4 wherein the cavity extends continuously around an end of the second rib.

6. The hollow fan blade half of claim 1 wherein the flared end is a portion of increased thickness.

7. The hollow fan blade half of claim 6 further including a plurality of the first ribs alternating with a plurality of the second ribs and wherein the cavity extends continuously in a serpentine path around each flared end of each of the plurality of first ribs and around an end of each of the plurality of second ribs.

8. The hollow fan blade half of claim 7 wherein the plurality of first ribs and the plurality of second ribs are at least substantially parallel and wherein the flared ends of the first ribs are staggered.

9. The hollow fan blade half of claim 8 wherein a width of the continuous cavity remains constant along the serpentine path.

10. The hollow fan blade half of claim 7 wherein the plurality of first ribs and the plurality of second ribs are at least substantially parallel, wherein a width of the continuous cavity remains constant along the serpentine path, and wherein the second ribs are thinner near the flared ends of the first ribs.

11. The hollow fan blade half of claim 7 wherein the plurality of first ribs and the plurality of second ribs do not intersect one another.

12. The hollow fan blade half of claim 7 wherein the plurality of first ribs and plurality of second ribs are each freestanding, such that they do not intersect any other ribs.

13. The hollow fan blade half of claim 1 wherein the the first rib and the second rib are parallel in a region adjacent the root edge.

14. A hollow fan blade including a pair of joined hollow fan blade halves according to claim 1 wherein the first and second ribs in one of the pair of hollow fan blade halves are directly joined to and abut corresponding first and second ribs in the other of the pair to form the hollow fan blade.

15. A gas turbine engine including a plurality of the hollow fan blades of claim 14, the gas turbine engine further including a combustor rotatably driving a plurality of turbine blades, wherein rotation of the turbine blades rotatably drives the plurality of hallow fan blades.

16. The method of claim 1 wherein the plurality of ribs do not intersect one another.

17. The hollow fan blade detail half of claim 1 wherein the first rib curves generally from a region adjacent the root edge toward the leading edge.

18. The hollow fan blade detail half of claim 1 wherein the first rib is one of a plurality of first ribs, each having a flared end, each of a plurality of cavities extending continuously around one of the plurality of flared ends, wherein the plurality of cavities are not continuous with one another.

19. The hollow fan blade detail half of claim 18 wherein the second rib is one of a plurality of second ribs, each of the second ribs completely separating an adjacent pair of the plurality of cavities.

20. A method for making a hollow fan blade including the steps of:
   a. machining a continuous cavity on a first substrate around a first rib, the continuous cavity following a path around a flared end of the first rib; and
   b. abutting the plurality of ribs on the first substrate with a second substrate to form a hollow fan blade.

21. The method of claim 20 wherein said step a) further includes machining the continuous cavity in a serpentine path to form a plurality of first ribs and a plurality of second ribs, the serpentine path extending continuously around the flared end of each of the plurality of first ribs.

22. The method of claim 20 further including the step of fanning a first rib on the second substrate and wherein said step b) further includes the step of abutting the first rib on the first substrate with the first rib on the second substrate.

23. In a gas turbine engine hollow fan blade having opposed walls each having a leading edge, a trailing edge, a root edge and a tip, the improvement comprising:
   a first rib and a second rib extending between the opposed walls, the first rib including a flared end.

24. The fan blade of claim 23 further including a cavity extending continuously around the flared end of the first rib.

25. A gas turbine engine including a plurality of the hollow fan blades of claim 24 disposed about a fan rotor, the gas turbine engine further including a combustor rotatably driving a plurality of turbine blades, wherein rotation of the turbine blades rotatably drives the plurality of hollow fan blades.

* * * * *

UNITED STATES PATENT AND TRADEMARK OFFICE
CERTIFICATE OF CORRECTION

PATENT NO. : 6,994,525 B2  Page 1 of 1
APPLICATION NO. : 10/765592
DATED : February 7, 2006
INVENTOR(S) : Weisse, Michael A. et al.

It is certified that error appears in the above-identified patent and that said Letters Patent is hereby corrected as shown below:

Column 8
Line 32: Please replace "hallow" with --hollow--

Line 60: Please replace "fanning" with --forming--

Signed and Sealed this

Twenty-second Day of August, 2006

JON W. DUDAS
*Director of the United States Patent and Trademark Office*